Oct. 1, 1940.   K. L. TATE ET AL   2,216,635
RECORDING INSTRUMENT
Filed Feb. 16, 1940
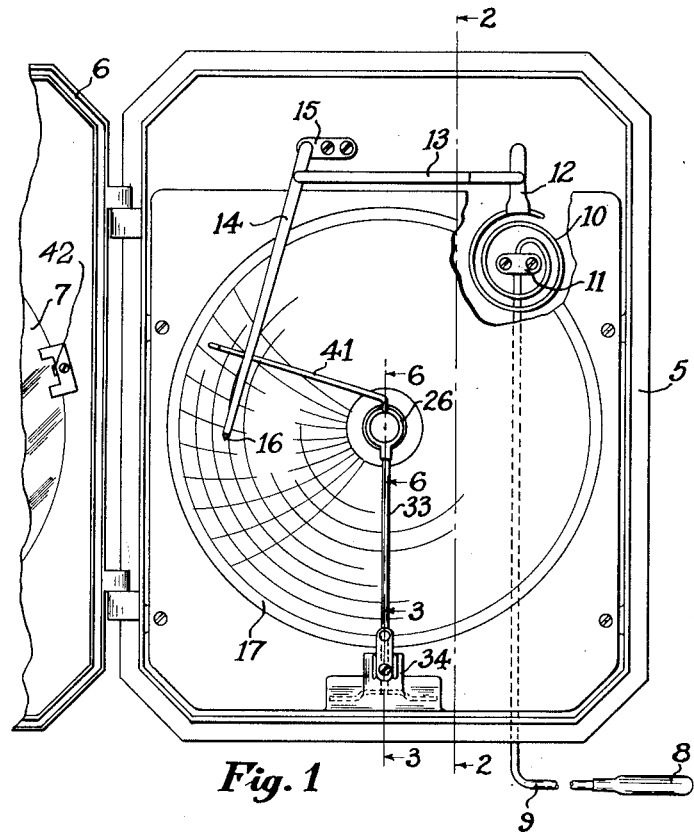
Fig. 1
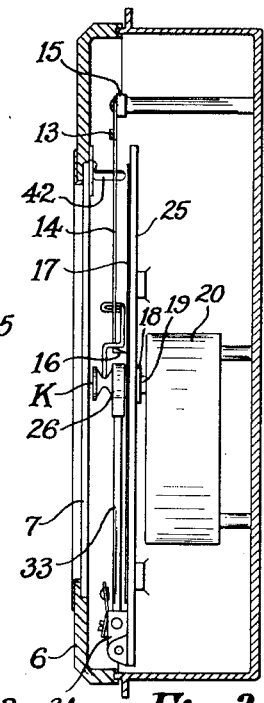
Fig. 2
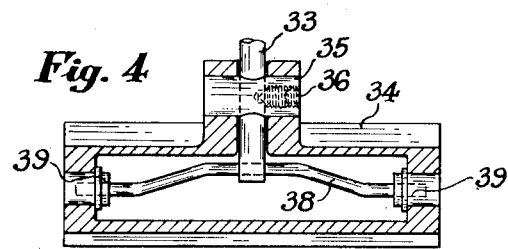
Fig. 4
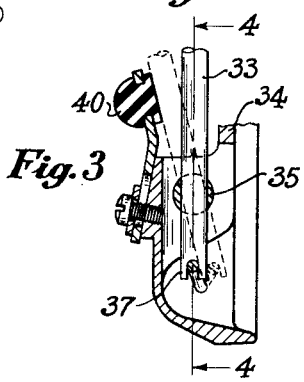
Fig. 3
Fig. 5
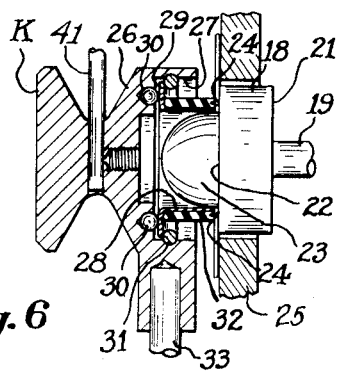
Fig. 6
INVENTOR.
KENNETH L. TATE AND
ARTHUR E. IRVING
BY D. Clyde Jones
ATTORNEY.

Patented Oct. 1, 1940

2,216,635

UNITED STATES PATENT OFFICE 2,216,635

RECORDING INSTRUMENT

Kenneth L. Tate and Arthur E. Irving, Rochester, N. Y., assignors to Taylor Instrument Companies, Rochester, N. Y., a corporation of New York Application February 16, 1940, Serial No. 319,226

4 Claims. (Cl. 232—75)

This invention relates to recording instruments and more particularly to recording instruments utilizing a removable circular paper chart or similar record disk.

In recorders of this type, the charts are designed for recording a condition to be continuously measured during the twenty-four hours of a day or during some lesser portion thereof. Therefore it becomes necessary to replace the chart in such recorders at least daily. In the course of replacing a chart, it is necessary to lift the pen arm of the recorder away from the chart plate in order that a used chart may be readily removed from and a fresh chart introduced into the recorder. Since the charts must thus be replaced frequently, it is important that chart replacement be effected in a simple manner with a minimum number of manual operations.

In accordance with the present invention there is provided in a recorder, a cap for releasably retaining a chart on a chart hub which cap is mounted on an arm adapted to swing the cap from a chart retaining position to a chart releasing position, the arm being respectively held in either of said positions by spring biasing means.

The various features and advantages of the invention will appear from the detailed description and claims when taken with the drawing in which Fig. 1 is a front elevation of the recorder with the door partially broken away and in open position; Fig. 2 is a vertical section taken substantially on the line 2—2 of Fig. 1; Fig. 3 is an enlarged fragmentary section taken substantially on the line 3—3 of Fig. 1; Fig. 4 is a fragmentary section taken on the line 4—4 of Fig. 3; Fig. 5 is a diagrammatic view illustrating the manner in which the chart retaining cap is held by snap action either in its open or its closed position; and Fig. 6 is an enlarged cross section through the chart retaining cap taken on the line 6—6 of Fig. 1.

Referring especially to Fig. 1, the numeral 5 generally designates the case of a recorder, the front of which may be closed by a hinged door 6 having a circular glass window 7 therein. The recorder case has mounted therein, mechanism for measuring changes in the condition to be recorded. In the present instance the recorder is assumed to be a recording thermometer, although the invention is equally applicable to pressure recorders, liquid level recorders and the like.

Since the present recorder is assumed to be a recording thermometer, the instrument includes a thermosensitive tube system comprising a bulb 8 located outside of the case and communicating through a capillary tube 9 with the fixed end of a Bourdon spring 10 within the case. This tube system is filled with a thermosensitive medium which may be a liquid such as mercury or may be a vaporizable liquid and its vapor. The fixed end of the Bourdon spring 10 is mounted as indicated at 11 on the inner rear surface of the instrument case. However, the free end of the Bourdon spring is provided with a suitable take-off bracket 12 to which one end of a link 13 is pivoted. The other end of this link is pivotally connected to a pen arm 14 which is mounted for swinging movement on a bracket 15. The free end of the pen arm is provided with a suitable pen or stylus 16 in a position to draw a temperature curve on a circular chart 17. The chart 17 which is made of paper or the like, is provided with concentric circles corresponding to degrees of temperature and with curved time lines radiating from the center of the chart. The chart is centrally apertured and is adapted to be retained on the chart hub 18 carried by the time shaft 19 which is rotated by a suitable clock motor 20 mounted within the case. The chart hub 18, comprising a circular block with parallel flat faces 21 and 22, is secured at the center of its face 21 to the free end of the time shaft 19 of the clock motor 20. The other face 22 of the block is provided with a centrally-located rounded projection 23, preferably hemispherical in form and of smaller diameter than the block but of a size to enter the central aperture in the chart to center the chart accurately. The face 22 of the block, adjacent the rounded projection, is provided with forwardly projecting pins 24 adapted to pierce the chart and thereby prevent its rotation independently of the hub. These pins are preferably asymmetrically positioned about the projection so that after the pins have once pierced the chart it can be replaced on the hub in only one position unless new holes are pierced in the chart. This provision affords an indication of chart tampering by an operator. It will be noted that a chart plate 25 which is supported within the case with its front surface flush with the surface 22 of the hub, affords a backing for that part of the chart extending beyond the hub.

A captive cap 26 provided with a knob K is mounted so that it is spring-biased toward either its released position in spaced relation to the chart hub, or toward its chart-retaining position in engagement with this hub. The cap has a cylindrical recess 27 therein to receive a flanged sleeve 28 of a diameter to enclose the rounded projection 23 on the hub. One surface of the sleeve flange 29 engages balls 30 resting in the circular ball race provided in the cap and the other surface of the flange is engaged by a retaining ring 31 resiliently held in a groove in the inner wall of the cap. The outer surface of the sleeve 28 is provided with a snugly fitting collar 32 of resilient material such as synthetic rubber, the edge of the rubber collar being positioned to have the projecting ends of the pins embedded therein when the cap is in its chart retaining position.

The cap may be mounted according to any arrangement in which it is spring-biased into engagement with the hub. In the preferred arrangement, the cap is secured to the free end of a substantially rigid support or rod 33 which is pivotally mounted at a point outside of the margin of the chart, for swinging movement toward and away from the chart hub. The specific mounting herein illustrated includes a bracket 34 fastened to the chart plate. This bracket provides bearings for a stub shaft 35 which has a transverse aperture therethrough to receive the support 33. A set screw 36 threaded into the end of the shaft anchors the support in fixed adjusted position with respect to the shaft. It will be noted that the support projects beyond the shaft and terminates in a forked end 37.

A suitable means operating by snap action, biases the support in its two positions of rest respectively illustrated in full lines and in dotted lines in Fig. 3. This means comprises a toggle spring 38 having an offset intermediate portion of the shape best illustrated in Fig. 4. The ends of this spring are rotatably supported in spaced bearings 39 mounted in the bracket. The intermediate offset portion of the spring engages the notch in the forked end of the support 33. It will be seen from Fig. 5 that the arcuate path of travel A of the intermediate portion of the spring caused by the movement of the support differs from what would be the arcuate path of travel B of the mentioned portion of the spring in the absence of distortion due to the movement of the support. This distortion of the spring from the path B into the path A between points C and D provides a snap action for the support both to the full line position and the dotted line position shown in Fig. 3. In both of these positions with the intermediate portion of the spring located either at C or D, the support is held biased by spring action. A buffer 40 mounted on the bracket 34 limits the outward movement of the cap 26 and its supporting rod 33 (Fig. 3).

The cap also has secured thereto a pen arm lifter 41 which extends under the pen arm to a point adjacent the margin of the chart. If desired, a substantial portion of the lifter may be approximately in contact with the chart plate in order to hold the chart snugly in engagement with this plate in the region of the pen arm stylus. If desired, a plurality of springs 42 mounted on the door 6, in spaced relation, about the edge of the circular window therein, project into engagement with the margin of the chart when the door is closed.

When it is desired to replace the chart, the knob K of the cap is pulled forward (Fig. 1) until the toggle moves the support forward beyond the dead center of the toggle spring 38 at which time it snaps to its position shown in dotted lines in Fig. 3. In this position the support engages the buffer 40 and the cap 26 is spaced away from the hub. The movement of the cap away from the hub moves the pen lifter 41 forward so that the lower portion of the pen arm 14 is flexed away from the chart support. The used chart is then disengaged from the projecting pins 24 on the hub 18 and is then withdrawn from the recorder by a movement toward the right. A fresh chart is inserted edgewise into the recorder from the right until it occupies a position under the pen lifter and the cap, the projection 23 on the hub entering the center aperture in the chart. The cap 26 is then moved to its retaining position in engagement with the hub merely by forcing the cap toward the hub. When the support 33 of the cap is moved beyond the dead center of the toggle spring, this spring forces the support in a direction so that its cap 26 engages the hub 18. At this time the projecting pins 24 on the hub pierce the chart and are embedded in the resilient collar 32 carried by the cap. It will be appreciated that the resilient collar and the sleeve 28 which carries it rotate with the hub, the ball bearings engaging the flange on the sleeve, to reduce friction between the stationary portion of the cap and the rotating sleeve. It will be appreciated that a movement of the cap toward the hub may be initiated either manually or merely by the act of closing the door 6 of the recorder at which time the glass in the door engages the knob K to force the cap inward.

We claim:

1. In a recorder, a time shaft provided with a chart hub to receive a chart, mechanism for rotating said shaft and hub, a cap for retaining a chart on said hub, a substantially rigid support for said cap, said support being pivotally mounted outside of the margin of a chart to be secured on said hub, said support being movable between a chart-retaining position and a chart-releasing position, and spring means for alternately biasing said support and the cap carried thereby, toward each of said positions.

2. In a recorder, a time shaft provided with a chart hub to receive a chart, mechanism for rotating said shaft and said hub, a cap for retaining a chart on said hub, a substantially rigid support for said cap, said support being pivotally mounted outside of the margin of a chart to be secured on said hub, said support being movable between a chart-retaining position and a chart-releasing position, and a toggle spring for alternately biasing said support and the cap carried thereby, toward each of said positions.

3. In a recorder, a time shaft provided with a chart hub to receive a chart, said hub having pins projecting therefrom to pierce said chart, mechanism for rotating said shaft and said hub, a cap for retaining a chart on said hub, a substantially rigid support on which said cap is fixed, a sleeve of resilient material rotatably carried by said cap with the sleeve edge in cooperative relation with said hub whereby said pins become embedded in the edge of said resilient sleeve, said support being pivotally mounted outside of the margin of a chart to be secured on said hub, and means for biasing said support and the cap carried thereby, toward said hub.

4. In a recorder, a time shaft provided with a chart hub to receive a chart, mechanism for rotating said shaft and said hub, a cap for retaining a chart on said hub, a substantially rigid support pivotally mounted in said recorder at a point outside of the margin of a chart to be secured on said hub, one end of said support having said cap mounted thereon, a long toggle spring mounted at its ends and provided with an off-set intermediate portion, said off-set portion engaging the other end of said support.

KENNETH L. TATE.
ARTHUR E. IRVING.